United States Patent [19]
Hutchison

[11] Patent Number: 5,218,189
[45] Date of Patent: Jun. 8, 1993

[54] BINARY ENCODED MULTIPLE FREQUENCY RF INDENTIFICATION TAG

[75] Inventor: Donald W. Hutchison, Wilmington, Del.

[73] Assignee: Checkpoint Systems, Inc., Thorofare, N.J.

[21] Appl. No.: 756,419

[22] Filed: Sep. 9, 1991

[51] Int. Cl.$^5$ ................... G06K 7/00; G06K 19/067
[52] U.S. Cl. .................... 235/439; 235/487; 340/572
[58] Field of Search ............. 235/449, 492, 494, 435, 235/439, 487, 451; 340/825.54, 572

[56] References Cited

U.S. PATENT DOCUMENTS

| | | | |
|---|---|---|---|
| 3,624,631 | 11/1971 | Chomet et al. | 340/539 |
| 3,810,147 | 5/1974 | Lichtblau | 340/572 |
| 3,913,219 | 10/1975 | Lichtblau | 29/592.1 |
| 3,967,161 | 6/1976 | Lichtblau | 361/402 |
| 4,021,705 | 5/1977 | Lichtblau | 361/402 |
| 4,498,076 | 2/1985 | Lichtblau | 340/572 |
| 4,567,473 | 1/1986 | Lichtblau | 340/572 |
| 4,598,276 | 7/1986 | Tait | 340/572 |
| 4,670,740 | 6/1987 | Herman et al. | 340/572 |
| 4,694,283 | 9/1987 | Reeb | 340/572 |
| 4,745,401 | 5/1988 | Montean | 340/572 |
| 4,792,790 | 12/1988 | Reeb | 340/572 |
| 4,864,280 | 9/1989 | van der Meij | 340/572 |
| 4,882,569 | 11/1989 | Dey | 340/572 |
| 4,910,499 | 3/1990 | Benge et al. | 340/572 |
| 4,920,335 | 4/1990 | Andrews | 340/572 |
| 5,081,445 | 1/1992 | Gill et al. | 340/572 |
| 5,103,210 | 4/1992 | Rode et al. | 340/572 |

*Primary Examiner*—John Shepperd
*Assistant Examiner*—Edward H. Sikorski
*Attorney, Agent, or Firm*—Panitch, Schwarze, Jacobs & Nadel

[57] ABSTRACT

A tag for identifying an item to which it is attached includes an inductance connected in parallel with a capacitance. The capacitance includes a plurality of individual capacitors, each of a predetermined different capacitance. The individual capacitors are connected to the inductance to establish a resonant circuit having a predetermined resonant frequency. At least one of the capacitors includes a dimple for shorting the capacitor when the tag is exposed to electromagnetic energy at the predetermined resonant frequency. The shorted capacitor establishes a second resonant frequency which may be used to identify which capacitor has become shorted. A binary "1" is assigned to either the shorted capacitor or the non shorted capacitor and a binary "0" is assigned to the capacitors which are not assigned a binary "1", the binary "1"s and "0"s combining to establish a numeric code uniquely associated with the tag.

7 Claims, 2 Drawing Sheets

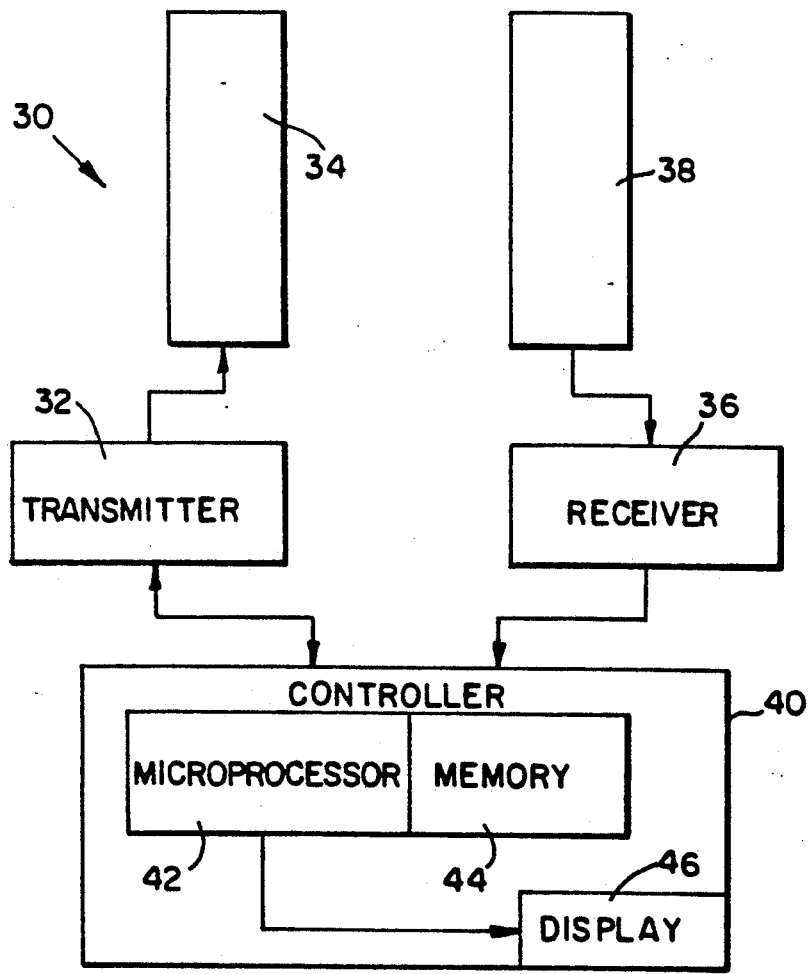

BINARY ENCODED MULTIPLE FREQUENCY RF INDENTIFICATION TAG

BACKGROUND OF THE INVENTION

The present invention relates generally to identification tags for use with an electronic identification system for identifying a particular item and, more particularly, to such identification tags which when activated form a unique numeric code.

The use of an electronic item identification system for identifying a particular item, such as luggage, library books and inventory items has become relatively wide spread. In general, such identification systems typically use bar code labels or tags which are associated with, or otherwise secured to an article or item in a manner in which the tag or label is readily accessible to a potential user. Identification tags may take on many different sizes, shapes and forms, depending upon the particular type of identification system and the particular use, the type and size of the item, the number of items, etc. In general, such identification systems are employed for tracking the location of a particular item and in some cases matching up the particular item with its respective owner. Generally, the identification of the item is monitored as the item passes through or near a particular area, such as an exit or entrance to a particular establishment.

As discussed above, one such electronic item identification system which has gained popularity utilizes a bar code tag. A bar code tag comprises a series of lines which represent a code which is scanned by a scanner, such as a laser scanner. A receiver electronically connected to the scanner receives data from the scanner and determines the identification code associated with the particular bar code. Typically, the scanner and receiver are located on one side of an exit. In this manner, when an item having an attached identification tag is moved into the designated area, generally just before passing through the exit, the tag is scanned. In this type of system, the scanner must be in direct proximity with the tag to achieve an accurate reading. Upon being scanned, an output signal is provided identifying the particular item and any other information which may be pertinent to the operator. While the bar code is capable of identifying and tracking the particular items being scanned, bar code systems are not typically used to match up a particular item with a particular owner. In an environment, such as a baggage claim area, the bar code system would be cumbersome and time consuming since the scanner must be placed directly on or close to the tag to achieve an accurate reading.

For example, in a baggage claim area, it would be beneficial to provide an identification tag for identifying a particular piece of luggage and correspondingly for the owner of the luggage to be positively identified as owning the particular piece of luggage. In an environment as such, it is likely that the tag will be used only once, so it is not necessary for the tag to be reusable. It is also beneficial to have an identification tag which can be deactivated once it has surpassed its useful life, e.g., when the luggage has left the baggage claim area. The tag should preferably be able to be scanned from a significant distance, such as three to ten feet to allow for quick and easy processing.

The present invention overcomes many of the problems associated with the prior art by providing an identification tag which can identify a particular item and the owner of the item, if desired. The identification tags are preferably manufactured in pairs, one generally attached to the particular item and the other retained by the owner of the item. Once a person approaches a designated area, both the identification tag associated with the owner and the identification tag associated with the particular item being claimed are scanned to determine the identification code of the tags. The code associated with each of the tags is a numeric code, preferably a binary code. If the codes of each tag match, an electronic identification system verifies that the person owns the particular item being claimed. If the codes of each tag do not match, then an alarm or other suitable indicator is asserted to inform those concerned that the particular item does not belong to the person claiming the item. The electronic system which scans the tag is preferably located a significant distance from the tag so that a person can walk through the scanned area with the item and the system can obtain an accurate reading from the tag.

The tags can also be used to insure that a person and their luggage board the same flight. A tag associated with each piece of luggage can be scanned as it is boarded on the plane. In addition, each passenger must board with a tag which is scanned as the passenger boards the plane. Shortly before takeoff, a listing of baggage tags can be compared to a listing of the passenger tags to ensure that a match is provided for each tag. If a tag associated with a piece of luggage does not match up to a tag held by a passenger on the plane, the luggage is removed from the plane.

SUMMARY OF THE INVENTION

Briefly stated, the present invention comprises a tag for identifying an associated or attached item. The tag comprises an inductance and a capacitance connected in parallel with the inductance. The capacitance comprises a plurality of individual capacitors. The individual capacitors are connected to establish with the inductance a first resonant circuit having a first predetermined resonant frequency. Each of the individual capacitors corresponds to one bit position of a number uniquely associated with the tag. At least one of the individual capacitors includes shorting means for causing the at least one capacitor to become short circuited when the first resonant circuit is exposed to electromagnetic energy at the first resonant frequency at a predetermined minimum power level to establish a second resonant circuit having a second resonant frequency. The second resonant frequency identifies which one of the plurality of individual capacitors has become short circuited.

The present invention is also directed to a method for identifying an item associated with a tag. The method comprises the steps of exposing the resonant circuit to electromagnetic energy at the resonant frequency at a predetermined minimum power level to cause at least one of the capacitors having a shorting means to short circuit thereby changing the resonant frequency of the resonant circuit. The resonant circuit is then exposed to electromagnetic energy at varying frequencies to determine the resonant frequency of the resonant circuit. Which one of the capacitors was short circuited is identified based on the resonant frequency. The above-mentioned steps are repeated until all of the capacitors having shorting means have been short circuited and each of the short circuited capacitors have been identified. A code is established based upon a combination of short circuited and non-short circuited capacitors to identify the item associated with the tag.

BRIEF DESCRIPTION OF THE DRAWINGS

The foregoing summary, as well as the following detailed description of a preferred embodiment of the invention, will be better understood when read in conjunction with appended drawings. For the purpose of illustrating the invention, there is shown in the drawings an embodiment which is presently preferred, it being understood, however, that the invention is not limited to the precise arrangement and instrumentalities disclosed. In the drawings:

FIG. 6 is a chart depicting the binary code formed as a result of the selected short circuited capacitors in the identification tag of FIG. 1; and FIG. 7 is a block diagram of an electronic identification system for use with the identification tag of FIG. 1.

DESCRIPTION OF THE PREFERRED EMBODIMENT

Figure 1:
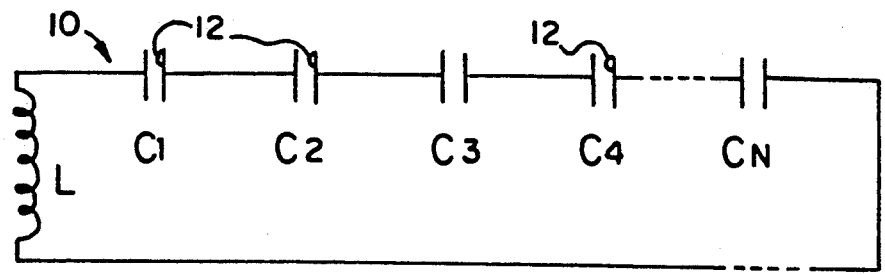
FIG. 1 is an electrical schematic of the resonant circuit of a binary coded identification tag in an initial condition in accordance with the present invention.

Referring to the drawings, wherein like numerals indicate like elements throughout, there is shown in FIG. 1, a schematic for an identification tag (not shown) in accordance with the present invention. The tag is generally adapted to be secured to or otherwise borne by an article or item of personal property, such as a piece of luggage (not shown), for which identification or surveillance is sought. The tag should be capable of being easily attached to the item in a permanent or semipermanent manner. A second identical tag (not shown) can also be generally adapted to be retained by the owner of a particular item for later identification to prove ownership of the item. Tags of this type are generally well-known in the electronic article surveillance art and are commercially available from various manufacturers, including Checkpoint Systems, Inc.

In the presently preferred embodiment, the tag comprises an insulative substrate fabricated of a material well-known in the art having predetermined insulative and dielectric characteristics. Conductive patterns (not shown) are formed on the front and rear surfaces of the insulative substrate utilizing electrically conductive materials of a known type, such as aluminum, in a manner which is well-known in the electronic article surveillance art and which is described in detail in U.S. Pat. No. 3,913,219 entitled "Planar Circuit Fabrication Process," which is incorporated herein by reference. While it is preferred that the known materials and methods set forth in the above-referenced U.S. Pat. No. 3,913,219 and other prior art be employed for the purpose of fabricating the identification tag of the present invention, it will be appreciated by those skilled in the art that any other suitable material and/or fabrication methods could alternatively be employed.

The identification tag of the present invention comprises circuitry means or electrical circuitry for initially establishing a resonant circuit 10 which is schematically illustrated by FIG. 1. While the tag of the present invention is similar to prior art tags and may be fabricated using the same or similar methods, the arrangement of the circuit elements differs from the prior art. The resonant circuit 10 is comprised of an inductance component or inductor L which is connected in parallel with a capacitance In the presently preferred embodiment, the capacitance comprises a plurality of individual capacitors $C_1, C_2, C_3, C_4 \ldots C_N$. Each individual capacitor has a different predetermined capacitance and each individual capacitor is connected in series to one another and in parallel with the inductance L to establish the resonant circuit 10 having a predetermined initial resonant frequency. It is to be understood by those skilled in the art that any number of capacitors may be implemented into the identification tag so long as each capacitor is of a different capacitive value.

In general, the resonant frequency of a resonant circuit is established by the following formula:

$$f = \frac{2\Pi}{\sqrt{LC}} \quad (1)$$

where:
f is the resonant frequency of the circuit;
L is the total inductance; and
C is the total capacitance as indicated below:

$$C = \frac{1}{\frac{1}{C_1} + \frac{1}{C_2} \ldots \frac{1}{C_n}}$$

The resonant frequency of the resonant circuit 10 as shown in FIG. 1 is established by the following formula:

$$f = \frac{2\Pi}{\sqrt{L}} \cdot \frac{1}{\sqrt{\frac{1}{\frac{1}{C_1} + \frac{1}{C_2} + \ldots \frac{1}{C_n}}}} \quad (2)$$

In the present embodiment, at least a selected one of the individual capacitors $C_1$–$C_N$ include a shorting means for causing the selected capacitor to become short circuited when the resonant circuit 10 is exposed to a high enough power level of electromagnetic energy at a resonant frequency. In the preferred embodiment, the short circuiting means is a "dimple" 12 which physically modifies capacitors $C_1$, $C_2$ and $C_4$ causing at least a portion of each of capacitors $C_1$, $C_2$ and $C_4$ to have a smaller dielectric width between the capacitor plates in the area where the dimple 12 is located. The presence of a dimple 12 in a capacitor for causing the capacitor to short circuit is well-known in the electronic article surveillance art and is described in detail in U.S. Pat. No. 4,498,076 entitled "Resonant Tag and Deactivator for Use in an Electronic Security System" which is incorporated herein by reference.

Thus each capacitor of the circuit shown in FIG. 1 is capable of assuming one of two states: short circuited or not short circuited depending upon whether the capacitor has or does not have a dimple 12. By assigning each state of a capacitor a particular binary state, i.e. either a binary "1" or a binary "0", and by assigning each capacitor in the circuit a particular bit position, i.e. $C_1$ is bit position N, $C_2$ is bit position N-1 . . . $C_N$ is bit position 1, a binary number may be associated with the circuit 10. In the embodiment shown in FIG. 1, capacitors, such as $C_1$, $C_2$ and $C_4$, which have a dimple and which become short circuited in a manner hereinafter described are assigned a binary "1". Similarly, capacitors such as $C_3$ and $C_N$ which do not have a dimple and which do not become short circuited are assigned a binary "0". As shown in FIG. 6, a binary number is established by positioning the binary "1"s and the binary "0"s in the proper sequence corresponding to the bit positions assigned to the individual capacitors.

By properly selecting which of the individual capacitors of the resonant circuit 10 receives a dimple, the binary number for each tag can be predetermined. Thus a series of tags can be made with a predetermined number N of capacitors and by making the dimple pattern different on each of the tags, as many as $2^N$ different dimple patterns can be established. In this manner a series of $2^N$ tags can be produced with each tag in the series having a uniquely associated binary number.

It will be appreciated by those skilled in the art that the foregoing description is only for the purpose of illustrating the present invention and should not be considered to be limiting. Thus, some means other than dimples may alternatively be employed for short circuiting of the selected capacitors. In addition, the binary states may be assigned to the shorted and unshorted capacitors in a different manner. Moreover, the bit positions assigned to the various capacitors may establish a code other than a simple binary number. For example, groups of capacitors may be banded together in a binary coded decimal format. Also, the capacitors may be connected together in some other manner such as a combination of capacitors in series and in parallel. Finally, the state of the selected capacitors may be changed in some manner. For example, selected capacitors could become open circuited rather than short circuited as described herein or a combination of some capacitors which become open circuited and some capacitors which become short circuited could be employed. In short, any change in the resonant circuit 10 which results in a detectable change in the resonant frequency which can be quantified to differentiate between tags for the purpose of identifying an item associated with or attached to the tag is envisioned by the present invention.

The identification tag circuit is initially as shown in FIG. 1 with all of the capacitors being functional. The tag is activated by exposing the tag to electromagnetic energy at a series of frequencies, preferably between 0 and 16 MHz. However, it is to be understood by those skilled in the art that the frequency may be in any suitable radio frequency range without departing from the scope and spirit of the invention. In the preferred embodiment, the initial resonant frequency is the highest possible frequency, 16 MHz. When the identification of a particular item is to be determined, the item and the attached tag are placed between antennas associated with a transmitter and a receiver of an electronic article identification system which will be discussed in further detail hereinafter. The transmitter initially transmits electromagnetic energy at the initial resonant frequency, 16 MHz, causing the resonant circuit to resonate. The presence of the resonant circuit results in a detectable change in the signal received by the receiver. The power level of the transmitter is then increased to a predetermined minimum level necessary to cause one of the dimpled capacitors to short circuit. The increased electromagnetic energy from the transmitter causes significant current flow to be established within the resonant circuit 10. The increased current flow causes the dimpled capacitors to become weakened and eventually causes one of the dimpled capacitors to short circuit. It is to be understood by those skilled in the art that the capacitor which short circuits depends upon a number of factors including the degree of weakness caused by the dimple 12. It need not be determined with certainty in advance which capacitors become short circuited. However, if each dimpled capacitor has a different capacitive value, the smallest capacitor should short first since it will receive the highest voltage.

A short circuited capacitor causes the signal detected by the receiver to change since the resonant frequency of the tag has changed and the resonant circuit no longer resonates at the frequency of the electromagnetic energy being transmitted. The change in resonant frequency is due to the greater total capacitance of the resonant circuit 10 which alters the resonant frequency of the circuit 10. In order to determine which capacitor has short circuited, the power level of the electromagnetic energy generated by the transmitter is lowered. Then the frequency of the transmitter is continuously lowered until a change in the signal received by the receiver indicates that the resonant circuit 10 is again resonating. The new resonant frequency of the resonant circuit 10 is noted by the receiver. By using the formula set forth above, the changes in capacitance of the resonant circuit 10 can be determined and the particular capacitor which has become short circuited can be identified and is assigned a binary "1" for its particular bit position.

The process is repeated until all of the capacitors with dimples are short circuited and each of the dimpled capacitors have been identified. A binary "1" is assigned to each dimpled capacitor position. A determination that all of the dimpled capacitors have short circuited is made when a final resonant frequency for the circuit is identified. At the final resonant frequency, the power level is increased to the predetermined minimum power level needed to short circuit a dimpled capacitor. However, the increased power level does not result in any further capacitor short circuiting as evidenced by no further changes in the resonant frequency. At this point, the final binary number of the tag is established.

The final binary number can then be converted to a decimal format or can be otherwise used to identify the item attached to the tag. For example, the owner of the item may have an identical tag which, when placed between the transmitter antenna and the receiver antenna, results in the generation of its own binary number in the same manner as the tag attached to the article. A simple comparison of the two numbers confirms that the holder of the second tag is the owner of the item attached to the first tag.

Figure 2:
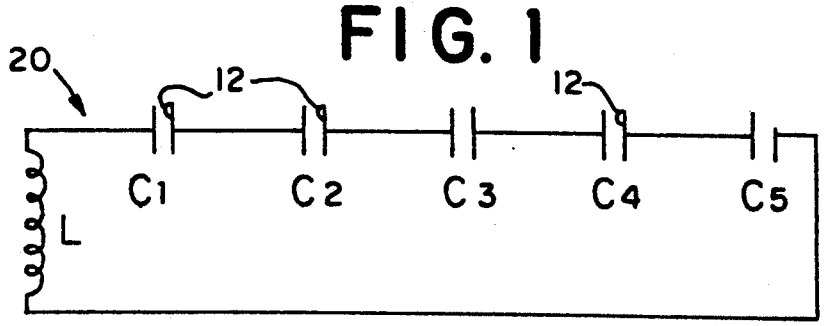
FIG. 2 is a schematic diagram of a resonant circuit of a sample binary coded ID tag in an initial condition in accordance with FIG. 1.

Referring specifically to FIG. 2, there is shown a resonant circuit 20 for an example identification tag which will be used to better explain how the binary code of the identification tag is determined by an electronic identification system. The resonant circuit 20 comprises an inductance L which is connected in parallel with five individual capacitors $C_1$, $C_2$, $C_3$, $C_4$ and $C_5$ which are connected in series to one another. Each individual capacitor has a different predetermined capacitance, the total of which is connected in parallel with the inductance L to establish the resonant circuit 20 having a predetermined initial resonant frequency. It is to be understood by those skilled in the art that any number of capacitors could be used in the resonant circuit and that the use of five capacitors is purely arbitrary for the purpose of this example. The initial resonant frequency can be established by inserting the value of the capacitors into equation 1 as follows:

$$f = \frac{2\Pi}{\sqrt{L}} \cdot \frac{1}{\sqrt{\frac{1}{\frac{1}{C_1} + \frac{1}{C_2} + \frac{1}{C_3} + \frac{1}{C_4} + \frac{1}{C_5}}}} \qquad (3)$$

Preferably, the initial resonant frequency is selected to be about 16 MHz and the values of the inductor and the capacitors are selected accordingly. However, any suitable initial radio frequency can be selected without departing from the scope and spirit of the invention. The identification tag is placed between the transmitter and the receiver antennas of an identification system 30 of the type functionally shown in FIG. 7.

Referring specifically to FIG. 7, there is shown a block diagram of an identification system 30 which can be used to identify the numeric code of the identification tag in accordance with the present invention. A transmitter 32 transmits electromagnetic energy at a frequency via a transmitter antenna 34. In the preferred embodiment, the initial frequency transmitted by the transmitter antenna 34 equals the resonant frequency of the resonant circuit 20. A receiver 36 receives the energy at the frequency transmitted by the transmitter antenna 34 via a receiver antenna 38. In the preferred embodiment, a person can walk between the transmitter antenna 34 and the receiver antenna 38 which an article having an identification tag attached to it and the identification system can identify the numeric code of the tag. It is to be understood by those skilled in the art that the tag may be directly scanned by a scanner or could alternatively be placed a significant distance from the transmitter antenna 34 and receiver antenna 38 and, in either case, the identification system is capable of identifying the code associated with the tag.

A controller 40 is electrically connected to the transmitter 32 and the receiver 36. The controller 40 controls the frequency of the energy being transmitted by the transmitter 32 and is capable of identifying the frequency being detected by the receiver 36.

A microprocessor 42 located within the controller compares the frequencies detected by the receiver 36 with a look up table located in the memory 44 of the microprocessor 42 to determine the numeric code of the identification tag as will be described hereinafter. The microprocessor 42 is also responsible for determining the frequency to be transmitted by the transmitter 32.

Once a tag has been placed between the transmitter antenna 34 and the receiver antenna 38 and the microprocessor 42 has identified the numeric code associated with the tag, the numeric code is displayed via a display 46. The display can be any kind of digital display such as, but not limited to, an LED or LCD display.

Figure 3:
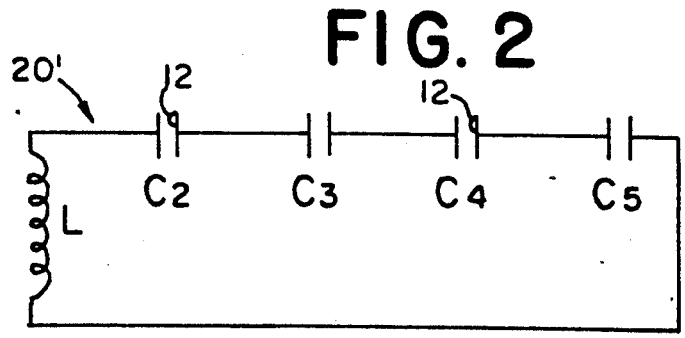
FIG. 3 is a schematic diagram of the resonant circuit of FIG. 2 after one of the dimpled capacitors has short circuited.

The transmitter 32 transmits a minimum power energy level which causes one of the dimpled capacitors ($C_1$, $C_2$ or $C_4$) located within the resonant circuit 20 of FIG. 2 to short circuit. As discussed above, it is not necessary to determine in advance which capacitor will short circuit. For the sake of the present example, it is assumed that capacitor $C_1$ has short circuited as illustrated by the circuit 20' shown in FIG. 3. The new resonant frequency of the resonant circuit 20' is established as follows:

$$f = \frac{2\Pi}{\sqrt{L}} \cdot \frac{1}{\sqrt{\frac{1}{\frac{1}{C_2} + \frac{1}{C_3} + \frac{1}{C_4} + \frac{1}{C_5}}}} \qquad (4)$$

Since the identity of the shorted capacitors may not always be known in advance, it may be necessary to obtain the new resonant frequency of the resonant circuit 20' to determine which capacitor has short circuited. The frequency generated by the transmitter 32 is gradually lowered until the circuit 20' resonates and the receiver 36 indicates that the new resonant frequency of the resonant circuit 20' has been reached. In the preferred embodiment, the controller 40 contains a microprocessor 42 which contains a memory 44 for storing a table of the possible resonant frequency values of the resonant circuit 20' obtained as a result of a particular capacitor being short circuited. The microprocessor 42 compares the actual new resonant frequency of the resonant circuit 20' with the stored values in the microprocessor memory and determines which capacitor has been short circuited. Once it has been determined that capacitor $C_1$ has short circuited, the microprocessor 42 assigns the bit position of capacitor $C_1$ a binary value of 1.

Figure 4:
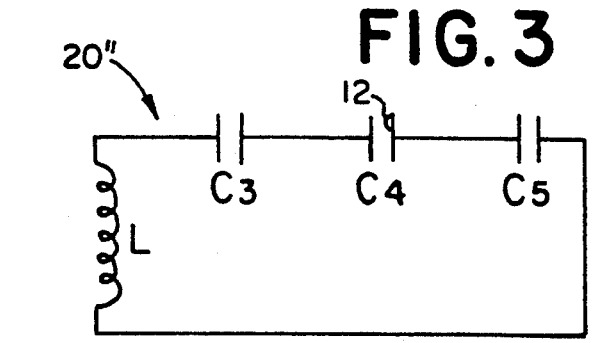
FIG. 4 is a schematic diagram of the resonant circuit of FIG. 2 after two of the dimpled capacitors has short circuited.

At this point in time, the power level of the electromagnetic energy transmitted by the transmitter 32 is raised causing the current flow throughout the resonant circuit 20' to be increased. The increased power level causes one of the remaining dimpled capacitors to short circuit. Since it is not necessary to predict in advance which of the dimpled capacitors has short circuited, for the sake of the present example, it is assumed that capacitor $C_2$ has short circuited and the resonant circuit 20" takes the form illustrated in FIG. 4. The new resonant frequency of the resonant circuit 10 is established as follows:

$$f = \frac{2\Pi}{\sqrt{L}} \cdot \frac{1}{\sqrt{\frac{1}{\frac{1}{C_3} + \frac{1}{C_4} + \frac{1}{C_5}}}} \qquad (5)$$

Again, it is necessary to find the new resonant frequency by again gradually lowering the frequency generated by the transmitter 32 until the circuit 20''' resonates and receiver 36 indicates that the resonant frequency of the resonant circuit 20" has been reached. The microprocessor 42 compares the new resonant frequency of the resonant circuit 20" to the stored tables of calculated resonant frequencies and as a result determines which capacitor has short circuited. Once the microprocessor 42 determines that capacitor $C_2$ has short circuited, the microprocessor 42 assigns the bit position of capacitor $C_2$ a binary value of 1.

Figure 5:
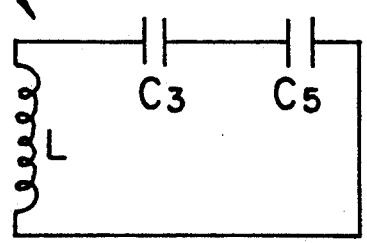
FIG. 5 is a schematic diagram of the resonant circuit of FIG. 2 after all of the dimpled capacitors have short circuited.

At this point in time, the power level of the electromagnetic energy transmitted by the transmitter 32 is increased to a minimum power level for causing one of the remaining dimpled capacitors, if any, to short circuit. In this case, the only remaining dimpled capacitor is $C_4$. Once capacitor $C_4$ short circuits, as illustrated in FIG. 5, a new resonant circuit $20'''$ is established with a new resonant frequency which is established as follows:

$$f = \frac{2\Pi}{\sqrt{L}} \cdot \frac{1}{\sqrt{\frac{1}{\frac{1}{C_3} + \frac{1}{C_5}}}} \quad (6)$$

The same process as described above is employed to identify the new resonant frequency and to determine that $C_4$ is the capacitor which has short circuited. Once the microprocessor 42 determines that capacitor $C_4$ has short circuited, the microprocessor 42 assigns the bit position of capacitor $C_4$ a binary value of 1.

As discussed above, the power level of the electromagnetic energy transmitted by the transmitter 32 is increased to a minimum power level for causing any remaining dimpled capacitors, if any, to short circuit. However, in this case, no additional dimpled capacitor are present in the resonant circuit $20'''$. Once the receiver 36 has detected a stable energy pattern for a predetermined period of time, the microprocessor 42 determines that there are no more dimpled capacitors located within the resonant circuit $20'''$. The microprocessor 42 then assigns the bit position of the remaining capacitors, in this case capacitors $C_3$ and $C_5$, a binary value of 0. The resulting binary code for the identification tag of FIG. 2 is established to be 11010 (digital 26). Using a resonant circuit, with five different capacitors, it is possible to establish thirty-two different binary numbers depending upon the dimple pattern of the capacitors.

Referring specifically to FIG. 6, there is shown a chart for determining the binary code for the identification tag as illustrated in FIG. 2. The chart indicates which capacitors are dimpled and which capacitors are not dimpled by placing a "X" in the appropriate box. Using the resonant circuit 20 shown in FIG. 2 as a sample tag, the chart indicates that $C_1$, $C_2$, and $C_4$ are dimpled and that $C_3$ and $C_5$ are not dimpled. As can be seen by chart, once it has been determined which of the capacitors are dimpled and which capacitors are not dimpled, the microprocessor 42 located within the controller 40 can designate the appropriate binary value to each capacitor to establish the complete binary number for the tag.

In the preferred embodiment, a second identical identification tag can be retained by the owner of the particular item to reinforce the ownership of the item. In addition, since the tag need only be used once, the tag is preferably non-reusable. The second tag operates in the same fashion as the first tag and further description thereof is omitted for convenience purposes only and is not limiting.

From the foregoing description, it can be seen that the present invention comprises a binary code identification tag for use with an electronic identification system. It is to be understood by those skilled in the art that the binary code identification tag could be used in many applications including ticket validation at sporting or entertainment events, one time tickets for opening gates or automatic garage doors or turnstiles, or as tokens for toll boths or mass transportation. It will be recognized by those skilled in the art that changes may be made to the above-described embodiment invention without departing from the broad inventive concepts thereof. It is understood, therefore, that this invention is not limited to the particular embodiment disclosed, but it is intended to cover any modifications which are within the scope and spirit of the invention as defined by the appended claims.

I claim:

1. A tag for identifying an associated or attached item comprising:
    an inductance; and
    a capacitance connected in parallel with the inductance, the capacitance comprising a plurality of individual capacitors, the individual capacitors being connected to establish with the inductance a first resonant circuit having a first predetermined resonant frequency, each of the individual capacitors having a different value, at least one of the individual capacitors including shorting means for causing said at least one capacitor to become short circuited when the first resonant circuit is exposed to electromagnetic energy at the first resonant frequency at a predetermined power level to establish a second resonant circuit having a second resonant frequency said second resonant frequency being dependent upon the particular individual capacitor which is short circuited;
    wherein each capacitor is capable of being in an active state or a shorted state, the different values determining the bit positions of a binary number uniquely associated with the tag, and the combination of capacitors having active and shorted states establishing the binary number.

2. A tag according to claim 1, wherein said capacitors are arranged in series.

3. A tag according to claim 1, wherein said shorting means are dimples which physically modify said at least one capacitor.

4. A tag according to claim 1, wherein said tag is non-reusable.

5. A tag according to claim 1, wherein the number of capacitors located on each said tag is 5.

6. A method of identifying an item associated with a tag comprised of an inductance connected in parallel with a capacitance, the capacitance comprising a plurality of individual capacitors each of a predetermined different capacitance, the individual capacitors being connected to establish with the inductance a resonant circuit having a predetermined resonant frequency, selected one or more of the capacitors including shorting means for short circuiting the selected capacitor when the resonant circuit is exposed to electromagnetic energy at the resonant frequency at a predetermined minimum power level, the method comprising the steps of:
    (a) exposing the resonant circuit to electromagnetic energy at the resonant frequency at a predetermined minimum power level, to cause one of said selected capacitors to short circuit thereby changing the resonant frequency of the resonant circuit;
    (b) exposing the resonant circuit to electromagnetic energy at varying frequencies to determine the resonant frequency of the resonant circuit;
    (c) identifying, based upon the resonant frequency, which one of the selected capacitors was short circuited;
    (d) repeating steps (a) through (c) until all of the selected capacitors have been short circuited and each of the short circuited capacitors have been identified; and (e) establishing a code based upon a combination of the short circuited and non-shorted circuited capacitors to identify the item associated with the tag.

7. The method of claim 6 wherein the code is established by assigning a binary "1" to either the short circuited capacitors or the non short circuited capacitors and assigning a "0" to the capacitors which have not been assigned a binary "1" to establish a binary number, the number of bits of the binary number corresponding to the total number of capacitors.

* * * * *